Patented Oct. 31, 1950

2,528,310

UNITED STATES PATENT OFFICE 2,528,310

MITICIDAL COMPOSITIONS COMPRISING 4-CHLOROPHENYL 4-CHLOROBENZENE SULFONATE

Richard W. Hummer and Eugene E. Kenaga, Midland, Mich., assignors to The Dow Chemical Company, Midland, Mich., a corporation of Delaware No Drawing. Application February 2, 1949, Serial No. 74,246

1 Claim. (Cl. 167—30)

This invention is concerned with mites and spider mites and is particularly directed to a method and composition for preventing mite injury to trees and other plants and for controlling existing infestations of these organisms.

Mites are a problem to agriculturists generally. *Paratetranychus pilosus* (European red mite), *Tetranychus bimaculatus* (two-spotted spider mite), *Bryobia sp.* and other related mite organisms are widely distributed throughout the world, and in the United States are known to attack many varieties of trees including apple, sweet and sour cherry, pear, peach, plum, prune, quince, and citrus. In addition, mites cause much damage to several varieties of "small fruit" plants such as raspberry, strawberry and currants; to ornamentals such as spruce; to flowering shrubs such as roses; and to beans and certain other vegetable plants. It is believed that no insect pest causes as great damage to so wide a range of plant growth as do the mites and spider mites.

As might be expected, a considerable assortment of parasiticidal materials have been developed and exploited for the control of mite organisms. Because of the variety of plant hosts concerned, the wide range of tolerance of such hosts to the common acaricides, problems of toxic residues, and the like, no currently available material has been found entirely satisfactory. The great reproductive capacity of mite organisms complicates their control. Thus, an acaracidal material adapted to accomplish the quick kill and control of adult mites may be entirely unsatisfactory because of its poor residual activity and failure to kill mite eggs.

The problem of mite damage to fruit trees has been aggravated in recent years by the increased popularity of the so called DDT type parasiticides. These materials are very effective against most common orchard insects but singularly specific in their failure to control mites. DDT and closely related toxicants appear to kill off the beneficial predatory organisms which normally aid in keeping mite infestation within reasonable bounds. With this upset of biological balance, mites are now a major problem in many areas where they previously were of small importance. The need for improved control methods and compositions is evident.

In accordance with the present invention it has been discovered that mites and spider mites are efficiently controlled by the application of 4-chlorophenyl 4-chlorobenzene sulfonate to plant surfaces. This control is accomplished in an entirely different fashion from accepted commercial methods. Where conventional acaricide compositions are designed to give quick reduction of existent mite populations by killing the adult mites, 4-chlorophenyl 4-chlorobenzene sulfonate is not particularly toxic to the adult form of the organism, but is effective and almost specific in low concentration to the eggs and egg masses of mites and spider mites. Apparent reductions in adult mite populations may be attributable to a measure of repellency characterizing the residues deposited in accordance with the new method.

Selectivity of action also characterizes the new method with respect to most other insects. To be sure, high concentrations of the compound may accomplish a measure of control of the adults and larvae of some common insect organisms, but by and large the present method appears to accomplish the control of mite and spider mite eggs almost exclusively. In light of immediate past experience with alleged all purpose parasiticides, this specificity constitutes a tremendous advantage in that it permits the efficient control of mites and spider mites without inducing a build up of other plant pests thru upsetting the biological balance by incidental destruction of beneficial parasites.

The new method consists of spraying, dusting or otherwise applying 4-chlorophenyl 4-chlorobenzene sulfonate on plant surfaces to deposit a persistent residue of the toxic material. Such application may be made prior to infestation of the plant or tree, or to plant surfaces already populated by mite and spider mite organisms. In either event, it is essential that complete coverage of all plant surfaces be obtained, including both the upper and under surfaces of the leaves. By such operation, the toxic residues contact existent eggs and are in such distribution as to become contacted by new eggs subsequently oviposited by adult mite and spider mite organisms.

As regards the persistency of the toxic residues, the new method is believed unique. In field determinations and exposed to all manner of weathering, single and thorough applications of 4-chlorophenyl 4-chlorobenzene sulfonate have been found to accomplish effective ovicidal controls (and resultant reductions in mite population) for as long as 60 to 90 days. Such prolonged residual action is not characteristic of commercial acaricides.

A further advantage for the new method consists of the non-phytocidal nature of the residues deposited on the plant surfaces. Applications of ovicidal concentrations of 4-chlorophenyl 4-chlorobenzene sulfonate in spray and dust formulations and under a wide variety of climatic conditions have failed to produce any evidence of leaf or fruit burn or russeting, or of other undesirable plant response. This is in sharp contrast to experience with many other acaricidal materials where time and temperature of application are frequently critical.

A similar favorable situation is found as regards toxicity of 4-chlorophenyl 4-chlorobenzene sulfonate to warm blooded animals. At concentrations and in amounts where many acaricidal materials have a high toxicity to animals, the compound of the present invention is substantially innocuous.

The new ovicidal composition with which the invention is particularly concerned, comprises the 4-chlorophenyl 4-chlorobenzene sulfonate as an active toxicant associated with a carrier, e. g. a finely divided powder, a solvent liquid of organic origin, a wetting and dispersing agent, an aqueous emulsion, and suitable combinations of any of these. In such formulation the sulfonate toxicant may be present in relatively high concentration to provide a concentrate adapted for further dilution, or in very dilute form and adapted for application as spray or dust without further modification. In concentrates, the 4-chlorophenyl 4-chlorobenzene sulfonate is conveniently employed in the amount of from about 5 to 95 per cent of the mixture. In dilute dust mixtures, from about 0.1 to 5.0 per cent by weight of toxicant is adequate. With dilute aqueous sprays, a minimum of from about 0.03 to 0.5 pound of the sulfonate toxicant per 100 gallons has been found to give good results, although larger amounts may be employed. The exact concentration employed is determined by the variety of mite to be controlled, the type of foliage concerned, the coverage possible with the available spray or dust apparatus, the general conditions of weather and temperature prevailing during application, and the type of composition selected.

Finely divided powders adapted for use with the new compositions and according to the method include talc, pyrophyllite, gypsum, fullers earth, bentonite, diatomaceous earth, wood flours, inorganic phosphates and clays. Suitable liquid carriers include petroleum oils, alcohols, acetone, liquid chlorinated hydrocarbons, pine oil, glycerides, and synthetic organic oils. Wetting and dispersing agents compatible in the composition include alkali and alkaline earth metal caseinates, blood albumen, alkali metal salts of long chain aliphatic sulfates, partially neutralized sulphuric acid derivatives of petroleum oils and natural occurring glycerides, sulphonated derivatives of phenols and aromatic acids and their salts, soaps, condensation products of alkylene oxides with organic acids, alkanolamines, and complex ether-alcohols and esters. Aqueous emulsions of petroleum distillates, fatty oils, and the like are also suitable as carriers. A preferred combination comprises the toxicant in mixture with both a finely divided solid carrier and a wetting and dispersing agent to provide a wettable powder.

The compound 4-chlorophenyl 4-chlorobenzene sulfonate is a white crystalline solid melting at 81°–83° C.

The following examples illustrate the invention but are not to be construed as limiting.

*Example 1*

Very finely divided 4-chlorophenyl 4-chlorobenzene sulfonate, sodium lauryl sulphate, and water were mixed and ground together in a ball mill to obtain a series of ovicidal spray compositions in the form of aqueous dispersions of 4-chlorophenyl 4-chlorobenzene sulfonate containing 0.25 pound of sodium lauryl sulfate per 100 gallons. Potted cranberry bean plants infested with two-spotted spider mites and eggs were dipped in these compositions to determine the range of toxicity of the latter against the mite pests. The following results were observed 6 days after treatment:

| Pounds of toxicant per 100 gallons | Per cent kill of spider mite eggs | Per cent kill of adult spider mites |
|---|---|---|
| 3.0 | 100 | 45 |
| 0.5 | 100 | 33 |
| 0.25 | 100 | 18 |
| 0.125 | 100 | 12 |
| 0.062 | 100 | 0 |
| 0.031 | 97 | 0 |

No foliage injury to the treated plants or formative effects were observed.

*Example 2*

Determinations were carried out with the compositions of Example 1 to ascertain the residual effect of the toxicant deposited on the bean leaf surfaces. In this operation, cranberry bean plants were dipped in an aqueous dispersion of 0.125 pound of 4-chlorophenyl 4-chlorobenzene sulfonate per 100 gallons, and thereafter allowed to dry.

One hour after dipping and drying, previously uninfested leaf surfaces were infested with adult mites which immediately laid eggs on the leaf surfaces. Six days after this infestation, 97 per cent of the eggs were found dead.

Three days after dipping and drying, a further group of bean plants were infested with the spider mite. Seven days after this infestation, 96 per cent of the eggs oviposited on the leaf surfaces were found dead.

*Example 3*

In a similar manner one pound of 4-chlorophenyl 4-chlorobenzene sulfonate, and 0.25 pound of sodium lauryl sulfate were mixed together in a ball mill and dispersed in sufficient water to give 100 gallons of spray mixture. This composition was employed in greenhouse operations using a portable power sprayer generating 150 pounds pressure for the control of two-spotted spider mites on beans, nasturtiums and Eclipse roses. The mites and mite eggs were controlled with no evidence of injury to the plants.

*Example 4*

Forty parts by weight of 4-chlorophenyl 4-chlorobenzene sulfonate, 1.5 parts of a long chain alkyl aryl sulfonate sodium salt marketed as Nacconal NR, 2 parts of sodium salt of condensed alkyl aryl sulfonic acid marketed as Daxad #27, and 56.5 parts of attapulgite clay were ground together to produce a wettable dust concentrate.

2.5 pounds of this material was dispersed in 100 gallons of water, and the resulting spray mixture applied with a hand sprayer to rambler roses heavily infested with both two-spotted spider mite and European red mite. The bushes were sprayed very heavily so that there was definite run off from all branch and leaf surfaces. A complete control of all mite eggs was obtained within a few days. The adult mite population declined to the vanishing point within a few days. Unsprayed roses continued to be heavily infested, with resulting leaf discoloration and partial defoliation.

Example 5

The spray composition of Example 4 containing 2.5 pounds of the wettable dust concentrate per 100 gallons was applied with a hand sprayer to spruce trees so heavily infested with European red mites and two-spotted spider mites that the foliage had started to brown and the trees were dropping their needles. Very careful application of the spray accomplished the complete wetting of all tree surfaces. There appeared to be a substantially complete control of mites by this treatment with no injury to the trees. Within 10 days of treatment, new chlorophyll had developed and the trees had begun to recover their green color. There was no more shedding of needles by the treated trees.

Example 6

The wettable powder composition of Example 4 was employed in a number of large scale operations in apple, plum and prune orchards for the control of mite pests generally. In these applications, the concentrate was dispersed in water and applied with conventional mobile spray equipment to stands of mature producing trees. Special care was exercised to insure complete coverage of all tree surfaces, including the trunk, branch and upper and under leaf surfaces. The amount of spray applied ranged from 10 to 30 gallons per tree, depending on tree size, and was such as to give complete coverage while avoiding excessive run off. The trees were sprayed on all sides and from underneath. The operation included dormant, delayed dormant, pre-pink, pink, and mid-summer applications.

At intervals following the treatments, the sprayed trees and check trees were examined to determine the existing mite population. This was accomplished by randomized sampling of 50–100 leaves from each treated and check plot. The mites on each leaf were then counted and results expressed on the basis of live mites per 100 leaves. The following table is a résumé of representative data obtained.

| Lbs. Composition per 100 gal. spray | Type of Application | Variety of tree | Interval between appln. and mite count | Live Mites per 100 leaves | |
|---|---|---|---|---|---|
| | | | | Treated Trees | Check Trees |
| 0.62 | mid-summer | Northern spy apple | 8 days | 193 | 1,900 |
| 1.25 | do | do | do | 60 | 1,900 |
| 1.25 | do | mixed variety apple | 7 days | 21 | 2,156 |
| 1.25 | do | mixed plum and prune | 4 days | 68 | 849 |
| 2.5 | pre-pink | mixed variety apple | 83 days | 2.9 | 127 |
| 2.5 | pink | do | 78 days | 2.7 | 127 |
| 2.5 | dormant | do | 88 days | 81 | 1,953 |
| 2.5 | delayed dormant | Chenango apple | 92 days | 144 | 2,244 |
| 2.5 | do | Red Delicious apple | 89 days | 19 | 2,000 |
| 2.5 | mid-summer | Northern spy apple | 7 days | 36 | 2,492 |
| 2.5 | do | Red Delicious apple | do | 36 | 2,156 |
| | | | 14 days | 22 | 1,416 |
| 2.5 | do | Jonathan apple | 7 days | 49 | 2,060 |
| 5.0 | dormant | Chenango apple | 110 days | 113 | 3,016 |
| 5.0 | do | mixed plum and prune | do | 138 | 2,480 |

Example 7

The animal toxicity of 4-chlorophenyl 4-chlorobenzene sulfonate was investigated as regards acute oral toxicity to guinea pigs and skin irritation on rabbits. With guinea pigs, a 10 per cent by weight solution of the compound in olive oil fed in a single dose in the amount of 0.1 gram of compound per kilogram of body weight allowed 100% survival. Dosages of 0.3 gram to 1.0 gram per kilogram of body weight caused the death of a part of the animals. A dosage of 3.0 gram per kilogram of body weight caused the death of all of the test animals.

A 10 per cent by weight solution of the compound in butylcarbitol acetate repeatedly applied to the ear of a rabbit, produced no significant irritation. When bandaged onto the shaven belly of a rabbit for several days, the solution caused a slight simple irritation.

Example 8

20 parts by weight of 4-chlorophenyl 4-chlorobenzene sulfonate, 74 parts of an aromatic solvent marketed as Amsco Solvent B (mostly xylene), 1 part of a sulfonated organic wetting agent (marketed as Trex 45), and 5 parts of a polyethylene glycol oleic acid complex (marketed as Trem–014–D) were mixed together to produce a liquid ovicidal concentrate having a specific gravity of 0.907 at 21° C.

This product is readily dispersible in water to produce emulsion type compositions for use in dormant application to pear and apple trees for the control of two-spotted spider mite and red spider. In the amount of 3 quarts per 100 gallons of water and carefully applied to all branch and trunk surfaces and to the litter adjacent to the trunk, the composition exerts an extended control of mite infestation.

Example 9

40 parts by weight of 4-chlorophenyl 4-chlorobenzene sulfonate, 51.5 parts of attapulgite clay (marketed as Diluex), 7.5 parts of bentonite, 0.5 part of a partially desulfonated sodium lignosulphate (marketed as Marasperse CB), and 0.5 part of a polypropylene glycol (molecular weight 1200) were ground together to produce a wettable powder concentrate.

The foregoing concentrate was employed as a water dispersion at 0.5, 1.0, and 2.0 pounds per 100 gallons for the control of Bryobia praetiosa and European red mite on an orchard or Bartlett pear trees. The sprays were applied to the mature trees with conventional spray equipment at the rate of approximately 9 gallons per tree with careful attention to distribution and coverage. The bloom was still on the trees but decreasing, and the leaves were just starting to emerge. Many mite eggs were present on the old wood, with but a few mites only in the proto-nymph stage. Because of the heavy potential mite infestation, the entire orchard including check trees was dusted by airplane with a hexaethyltetraphosphate dust a few days after application of the 4-chlorophenyl 4-chlorobenzene sulfonate.

121 days following the spraying with the sulfonate toxicant composition, the various blocks of trees were inspected and randomized observations made to determine the degree of mite control. The following data were recorded:

| Lbs. composition per 100 gals. spray | Dead Bryobia adults per leaf | Viable red mite eggs per leaf | Living red mite adults per leaf |
|---|---|---|---|
| 0.5 | 3-10 | 1-3 | less than 0.5 |
| 1.0 | less than 0.5 | less than 1 | Do. |
| 2.0 | do | less than 0.5 | none. |
| control trees | 10-25 | 10-25 | 1-3. |

The presence or absence of dead *Bryobia praetiosa* adults at the time of counting constituted an index of the ovicidal effectiveness of the initial application, since the adults present on the leaves and available to be killed by the hexaethyltetraphosphate dust were those hatching from eggs not killed by the original application of the sulfonate toxicant. Trees heavily infested with mites were adjacent to the treated orchard and provided a source of reinfestation throughout the growing season. Significant differences were observed in the foliage color and general appearance of the treated and check plots, with the treated trees in much better condition than those which were not sprayed with the 4-chlorophenyl 4-chlorobenzene sulfonate composition. No injury resulted from the application of the ovicidal spray mixture.

Example 10

The composition of the previous example was similarly dispersed in water at the rate of 1 pound per 100 gallons, and the resulting spray carefully applied to the trunk, branch, and upper and under leaf surfaces of mature Bartlett pear trees bearing fruit 1 to 1.5 inches in diameter. The rate of application was 12 gallons per tree. The trees received no other miticidal treatment. At time of application, the population of two-spotted spider mite was from 1 to 3 mites per leaf. Check trees were untreated. Observations of mite control were made 26, 47, 61, and 68 days following treatment. The following data were recorded:

| Days after treatment | Mites per leaf on treated trees | Mite injury treated trees | Mites per leaf check trees | Mite injury check trees |
|---|---|---|---|---|
| 26 | 0 | None | 25-50 | light foliage discoloration. |
| 47 | 0.5-1 | do | 50-100 | heavy foliage discoloration. |
| 61 | 0.5-1 | do | 25-50 | leaves 50% killed or dropped. |
| 68 | 0.5-1 | do | 1-3 | same. |

Here again, high mite populations in adjacent orchards provided a constant source of reinfestation. No tree, leaf, or fruit injury resulted from the application of the 4-chlorophenyl 4-chlorobenzene sulfonate.

Example 11

The wettable dust concentrate as described in Example 9 was dispersed in water at the rate of 0.5, 1.0, and 2 pounds per 100 gallons and the resulting sprays applied to Zinfandel grapes for the control of Pacific mite. The vines had old wood 2 to 2.5 feet high and shoots to a length of 6 feet. The soil was dry and sandy and the vineyard was not under irrigation. The fruit was the size of large peas. There were from 10 to 25 mites per leaf with the population steadily increasing. The application was made at the rate of 3 to 4 gallons per vine with conventional rig, care being taken to wet all trunk, shoot, fruit and upper and under leaf surfaces. The vineyard was inspected and mite counts taken 2 days, 21 days, and 30 days after treatment. The following results were obtained:

| Pounds composition per 100 gallons | Number Pacific mite adults per leaf | | |
|---|---|---|---|
| | 2 days | 21 days | 30 days |
| 0.5 | 1-3 | 0.5-1 | 1.3 |
| 1.0 | 1-3 | 1-3 | 0.5-1 |
| 2.0 | 1-3 | less than 0.5 | 1 |
| Check | 25-30 | 25-30 | 0.5-1 |

The unsprayed vines exhibited significant loss in vigor and severe leaf discoloration. On the treated vines, no injury attributable either to mites or the spray mixture was observed.

Example 12

The composition of Example 9 at 0.5, 1.0, and 2.0 pounds per 100 gallons was applied for the control of European red mite on Newtown pippin apples. The orchard in question was on sandy soil and consisted of medium to large trees with a light set of half developed, heavily scabbed apples. The mite population was 50 to 100 adults per leaf. The compositions were applied at 30-50 gallons per tree with conventional spray equipment, care being taken to soak all tree surfaces thoroughly. No other miticidal materials were applied to the trees. Inspections were made 2, 4, 14, and 27 days following treatment, with the following observations being recorded:

| Pounds composition per 100 gallons | Number of Adult European red mites per leaf after— | | | |
|---|---|---|---|---|
| | 2 days | 4 days | 14 days | 27 days |
| 0.5 | 12-25 | 3-10 | 1-3 | 1-3 |
| 1.0 | 12-25 | 3-10 | 1-3 | less than 0.5 |
| 2.0 | 12-25 | 10-25 | 0.5-1 | less than 0.5 |
| Check | 50-100 | 50-100 | 50-100 | 3-4 |

The spray compositions caused no injury to the trees, and resulted in an improved foliage condition as compared to the check trees.

We claim:

An ovicidal composition for the control of the eggs of mites and spider mites which comprises an aqueous dispersion of a wettable powder concentrate including 4-chlorophenyl 4-chlorobenzene sulfonate as the active toxic ingredient, the latter compound being present in the ultimate aqueous spray in the minimum proportion of 0.03 pound per 100 gallons of spray.

RICHARD W. HUMMER.
EUGENE E. KENAGA.

REFERENCES CITED

The following references are of record in the file of this patent:

UNITED STATES PATENTS

| Number | Name | Date |
|---|---|---|
| 2,148,928 | De Meuron | Feb. 28, 1939 |

OTHER REFERENCES

Lauger et al., Helv. Chim. Acta, vol. 27, June 18, 1944, pp. 892-908.

Metcalf, J. Econ. Ent., vol. 41, No. 6, December 1948, pp. 875-882.